United States Patent [19]
Klinger

[11] Patent Number: 4,540,219
[45] Date of Patent: Sep. 10, 1985

[54] INFANT SAFETY SEAT ATTACHMENT

[76] Inventor: Christine L. Klinger, 515 Rebecca, Fayetteville, Ark. 72701

[21] Appl. No.: 541,417

[22] Filed: Oct. 13, 1983

[51] Int. Cl.³ .............................................. A47C 7/62
[52] U.S. Cl. ..................................... 297/487; 5/490; 297/188; 446/227
[58] Field of Search ............... 297/220, 223, 487, 488, 297/482, 181, 188; 5/490, 434, 437; D21/148; 446/26, 227, 268

[56] References Cited

U.S. PATENT DOCUMENTS

| | | | |
|---|---|---|---|
| 2,219,130 | 10/1940 | Herrmann | 446/227 X |
| 2,762,161 | 9/1956 | Danielson | 446/227 |
| 3,014,307 | 12/1961 | Dupuis | 446/227 |
| 3,085,610 | 4/1963 | Vardan | 446/227 X |
| 3,204,367 | 9/1965 | Stubbmann | 446/227 |
| 3,512,829 | 5/1970 | Paris | 297/488 |
| 3,789,546 | 2/1974 | Morrison | 446/227 X |
| 3,957,282 | 5/1976 | Finnigan | 297/482 |
| 4,309,784 | 1/1982 | Cohen | 5/490 |

Primary Examiner—James T. McCall
Attorney, Agent, or Firm—Harvey B. Jacobson

[57] ABSTRACT

An activity cover of sheet material is wrapped around the shield of an infant's automobile safety seat. The cover has strips of friction fastener material on a surface facing an infant in the seat and stuffed toys with complementary friction fastener elements for attachment to and detachment from the cover strips.

5 Claims, 4 Drawing Figures

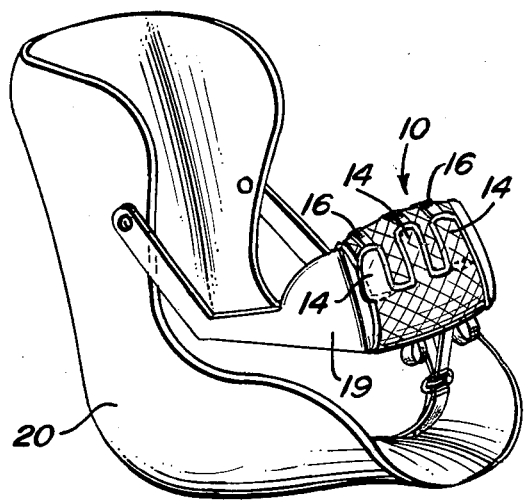
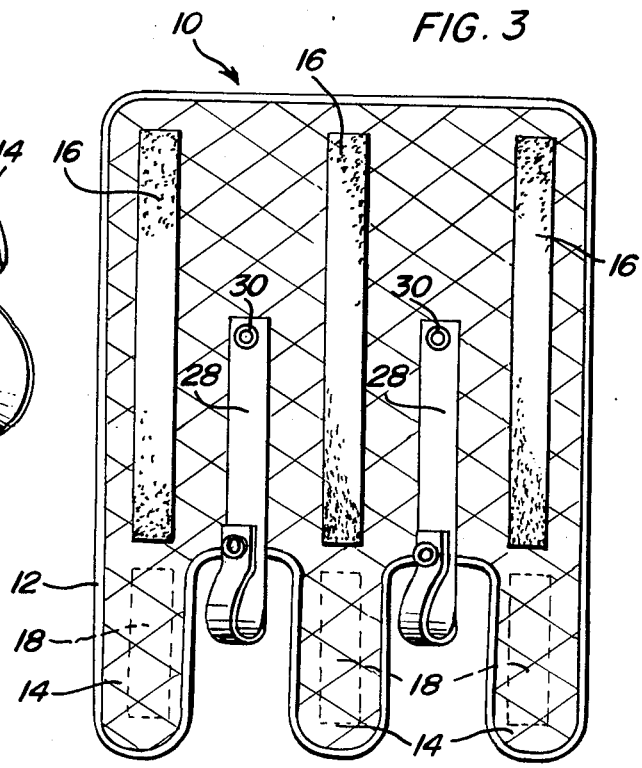
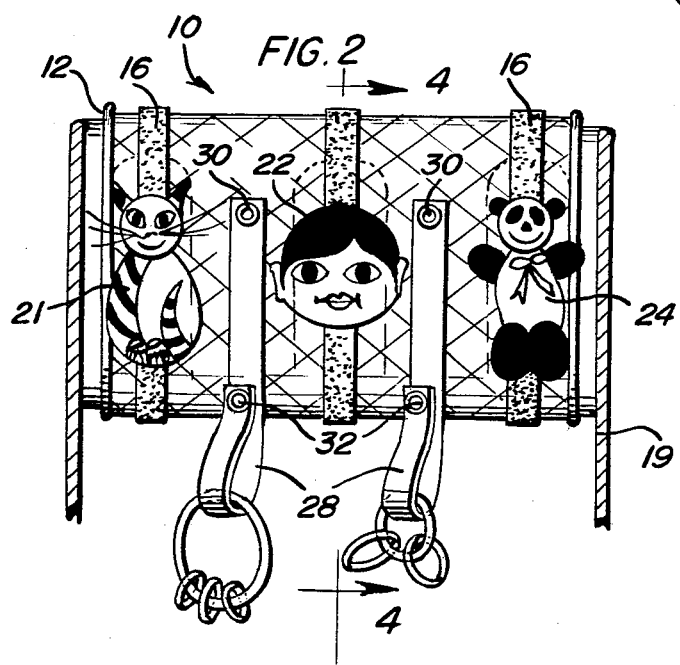
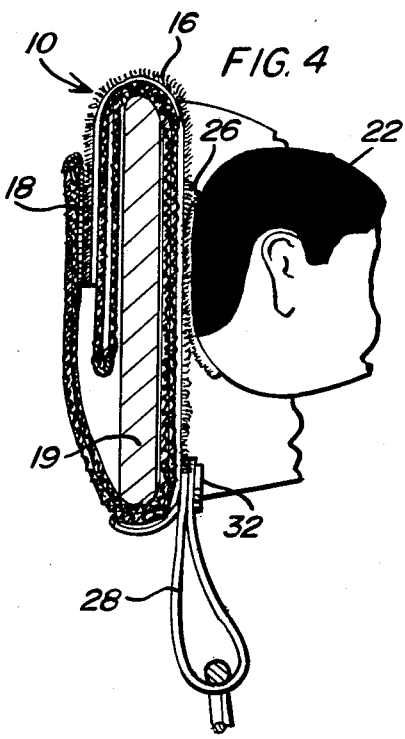

INFANT SAFETY SEAT ATTACHMENT

BACKGROUND OF THE INVENTION

This invention relates generally to infant safety seats used in automobiles to provide protection to an infant while traveling, and more particularly to an attachment in the form of a wrap-around cover which may be fitted to a safety seat shield and which includes means for providing amusement to an infant occupying the safety seat.

STATEMENT OF PRIOR ART

Applicant acknowledges the following U.S. patents relating to children's safety seats and the like, none of which discloses an attachment having the features of the present invention.

2,330,538
3,232,665
3,713,695
4,311,339
4,143,915

SUMMARY OF THE INVENTION

The present invention provides a cover of sheet material for wrapping around a shield of an infant's automobile safety seat and the like, releasable securing means for retaining the cover on the shield in wrapped around condition, at least one infant's amusement item, and means for releasably attaching the item to a surface of the cover which is accessible to an infant in the seat. The cover may, for example, have strips of friction fastener material such as Velcro on its opposite surfaces, for releasably securing the cover in wrapped around condition on the shield, at least one of the strips being extended to form the means for attaching said amusement item to the cover, the amusement item which may, for example, comprise a stuffed toy, having a complementary strip of friction fastener material thereon.

A cover in accordance with the invention may be readily applied to and remove from the shield of a safety seat, and affords a convenient means for providing safe amusement to an infant while traveling. The cover may also be used in other applications, for example in association with infants' seats other than automobile safety seats, where an activity cover is required.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a perspective view of an infant's automobile safety seat having a shield fitted with a wrap-around activity cover in accordance with the invention.

FIG. 2 is an elevational view, on an enlarged scale of the cover on the shield as viewed by an infant in the seat.

FIG. 3 is a plan view of the cover unwrapped from the shield.

FIG. 4 is a sectional view on line 4—4 of FIG. 2.

DESCRIPTION OF PREFERRED EMBODIMENT

Referring initially to FIG. 3 in particular, there is illustrated a wrap-around cover 10 for the shield of an infant's automobile safety seat, the cover comprising a generally rectangular sheet of quilted polyester-cotton fabric, the edges of which may be bound with bias tape 12, and the cover having three tongues 14 and one end. Sewn on one surface of the cover in alignment with the tongues are elongate Velcro strips 16 covering substantially the entire length of the cover up to the tongues. On the other surface of the cover are sewn complementary but shorter Velcro strips 18 along the respective tongues. The arrangement is such that the cover may be wrapped around a shield 19 of an infant's safety seat 20 with strips 18 engaging the terminal portions of strips 16, as shown in FIGS. 1, 2 and 4, and with the remainder of strips 16 being uncovered so as to face an infant occupying the seat. The length of strips 16 affords a degree of adjustment to the cover so that it can be applied to shields of varying size.

The apparatus may include stuffed play figures 21, 22, 24 each of which has a Velcro strip 26 at the back complementary to strips 16, so that an infant may amuse itself with the play figures, detaching the figures from, and attaching the figures to the uncovered portions of strips 16.

The cover may also have straps 28 for small items such as teething rings, rattles or the like, connected to the cover betwen strips 16. Straps 28 may also be adjusted for length and small items may be releasably hooked onto the straps by snap fasteners 30 and 32.

The activity cover may be readily applied to a wide range of infants' safety seats having shields, and provides versatile amusement for an infant while traveling without sacrificing any protection afforded by the safety seat. As previously indicated, the cover may also be used for applications other than safety seats.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An activity cover of sheet material for wrapping around a front portion of an infant's seat and the like to provide amusement for the infant, releasable securing means on the cover for retaining the cover in wrapped around condition, at least one infant's amusement item, and means for releasably attaching the item to a surface of the cover which is accessible to an infant occupying the seat, wherein the releasable securing means comprises strips of friction fastener material on opposite surfaces of the cover, and wherein at least one of said strips on one surface of the cover is extended in relation to a cooperating strip on the other surface of the cover to provide the means for releasably attaching the amusement item to the cover, the amusement item also having a strip of friction fastener material for releasable attachment to the extended portion of said at least one strip.

2. The invention of claim 1 wherein the cover is of substantially rectangular form with tongues along one edge, said at least one of the strips extending substantially along the entire length of one surface of the cover up to the tongue, and the cooperating strip on the other surface of the cover extending along the tongue.

3. The invention of claim 1 wherein the cover includes at least one strap for holding small items, and means for adjusting the straps for length between a pair of said strips.

4. An activity cover for wrapping around a forward portion of an infant's seat or the like comprising a substantially rectangular sheet of fabric having projecting tongues on one edge, strips of friction fastener material secured along the tongues on one surface of the sheet, and cooperating strips of friction fastener material secured along substantially the entire length of the cover up to the tongue on the other surface of the cover, the cover further including at least one infant's amusement item having a strip of friction fastener material thereon for releasably securing the item to one of said cooperating strips on the cover.

5. The invention of claim 4 including adjustable straps secured to the cover between said cooperating strips, and fastener means on the straps for securing infants' activity items.

* * * * *